(12) United States Patent
Dallara et al.

(10) Patent No.: US 8,262,309 B2
(45) Date of Patent: Sep. 11, 2012

(54) CLAMP YOKE AND A METHOD OF FORMING A CLAMP YOKE

(75) Inventors: Guido Dallara, Venette (FR); Patrice J. Burnier, Paris (FR)

(73) Assignee: Steering Solutions IP Holding Corporation, Saginaw, MI (US)

( * ) Notice: Subject to any disclaimer, the term of this patent is extended or adjusted under 35 U.S.C. 154(b) by 793 days.

(21) Appl. No.: 11/821,098

(22) Filed: Jun. 21, 2007

(65) Prior Publication Data

US 2007/0298889 A1    Dec. 27, 2007

(30) Foreign Application Priority Data

Jun. 21, 2006  (GB) .................................. 0612314.5

(51) Int. Cl.
*F16B 7/08* (2006.01)
(52) U.S. Cl. ...... 403/233; 403/235; 403/290; 403/359.1
(58) Field of Classification Search .......... 403/233–236, 403/359.1–359.6, 290; 464/134
See application file for complete search history.

(56) References Cited

U.S. PATENT DOCUMENTS 1,830,976 A * 11/1931 Ashworth ..................... 403/366
4,068,965 A *  1/1978 Lichti ........................... 403/313

FOREIGN PATENT DOCUMENTS

| DE | 3522487 A1 | 1/1987 |
| DE | 9404853.3 U1 | 7/1994 |
| FR | 2857888 | 1/2005 |

OTHER PUBLICATIONS

European Office Action with Search Report for application No. 07075475.9-1264/1870310 dated Jun. 26, 2009.

* cited by examiner

*Primary Examiner* — Victor MacArthur
(74) *Attorney, Agent, or Firm* — Cantor Colburn LLP

(57) ABSTRACT

A clamp yoke for providing a pivotable connection between a pair of rotatable shafts, including a base portion and an ear portion at each end of the base portion, the yoke having a substantially symmetrical U-shaped profile. Each ear portion has a hole, the holes in the ear portions being substantially axially aligned on a first axis. The base portion has an aperture having an axis substantially perpendicular to the first axis. The base portion has a bolt hole adjacent one side of the aperture, the bolt hole having an axis which is substantially perpendicular to the aperture axis and the first axis. The base portion has a slot extending from one end of the base portion, through the bolt hole and into the aperture, the slot extending beyond the aperture on the opposite side of the aperture to the bolt hole. Also a method of forming the clamp yoke.

14 Claims, 2 Drawing Sheets

CLAMP YOKE AND A METHOD OF FORMING A CLAMP YOKE

TECHNICAL FIELD

The present invention relates to a clamp yoke for providing a pivotable connection between two rotatable shafts, and to a method of forming such a clamp yoke.

BACKGROUND OF THE INVENTION

The clamp yoke on a steering column or I-shaft of a motor vehicle is intended to transmit the steering torque to the pinion for the life of the vehicle, and without lash. These requirements can be problematic, especially in the case where electric power steering is used, and where the connection with the pinion is by serrations. Design limitations include bolt tightening torque (limited by material characteristics and the need to avoid thread stripping); and minimum/maximum lash between the yoke and pinion (the minimum lash has to guarantee the assembly and so the maximum lash is given by minimum lash plus feasible tolerances for yoke and pinion interface). The worst case is given by the lower limit of bolt tightening torque and the upper limit of the lash between the yoke and the pinion. In this condition there is a need to improve at the maximum the elasticity of the yoke to be able to lose or reduce the minimum of the tightening torque to deform the yoke (have the higher portion of tightening torque that is transformed in pressure between yoke and pinion). This clamping efficiency helps to withstand high torque peaks that can especially occur with electric power steering systems.

FIGS. 1 through 4 illustrate known arrangements for trying to overcome the above mentioned problems. Each of these illustrated arrangements show a clamp yoke 10 having a substantially U-shaped profile and including a base portion 12 and a pair of ear portions 14, 16. Axially aligned holes 18 are formed in the ear portions 14, 16. A serrated aperture 20 is formed in the base portion 12. A bolt hole 22 is formed in the base portion 12 adjacent the aperture 20. A slot 24 is cut from one end 26 of the base portion 12 to extend through the bolt hole 22 and open into the aperture 20. In FIG. 1, an additional hole 28 is drilled in one ear portion 14 of the yoke 10 at the end of the slot 24 to move the "hinge" as far as possible from the bolt hole 22. The elasticity of the yoke 10 on the other end 30 of the base portion 12 to the bolt hole 22 is improved, as shown in FIG. 2, by producing an asymmetric yoke 10 by reducing the amount of material on the other end 30 of the base portion 12. As an alternative, the elasticity of the yoke 10 is improved by drilling an axial hole 32 in the base portion 12 on the opposite side of the aperture 20 to the bolt hole 22, and then ensuring that the axial hole 32 opens through opening 34 into the aperture 20 during a subsequent broaching operation, as shown in FIGS. 3 and 4.

An example of the prior art is shown in FR-A-2857888.

SUMMARY OF THE INVENTION

It is an object of the present invention to provide an improvement to the known arrangements.

To this end, a clamp yoke in accordance with the present invention for providing a pivotable connection between two rotatable shafts includes a base portion and an ear portion at each end of the base portion, the yoke having a substantially symmetrical U-shaped profile; wherein each ear portion has a hole, the holes in each ear portion being substantially axially aligned on a first axis; wherein the base portion has an aperture, the aperture having an axis substantially perpendicular to the first axis; wherein the base portion has a bolt hole adjacent one side of the aperture, the bolt hole having an axis which is substantially perpendicular to the aperture axis and the first axis; and wherein the base portion has a slot extending from one end of the base portion, through the bolt hole and into the aperture; wherein the slot in the base portion extends beyond the aperture on the opposite side of the aperture to the bolt hole.

The present invention also includes a method of forming a clamp yoke for providing a pivotable connection between two rotatable shafts, the method including the steps of cold forming a part having a substantially symmetrical U-shaped profile from a metallic blank, the part having a base portion and an ear portion at each end of the base portion; forming axially aligned holes in the ear portions; forming an aperture in the base portion, the aperture having an axis which is substantially perpendicular to the axis of the holes in the ear portions; forming a bolt hole in the base portion adjacent one side of the aperture, the bolt hole having an axis which is substantially perpendicular to the axis of the aperture and the axis of the holes in the ear portions; and cutting a slot in the base portion, the slot extending from one end of the base portion, through the bolt hole and the aperture and into the base portion on the opposite side of the aperture to the bolt hole.

The present invention provides a clamp yoke which is easier and cheaper to manufacture than prior known arrangements, as well as providing the required elasticity of the yoke alongside the required clamping efficiency.

BRIEF DESCRIPTION OF THE DRAWINGS

The present invention will now be described, by way of example, with reference to the accompanying drawings, in which:

Referring to FIGS. 5 and 6, the clamp yoke 110 includes a base portion 112 and a pair of ear portions 114, 116. The yoke 110 has a substantially symmetrical U-shaped profile, and the ear portions 114, 116 extend from opposite ends 126, 130 of the base portion 112. Each ear portion 114, 116 has a hole 118, wherein the holes in each ear portion are substantially axially aligned on a first axis A. The base portion 112 has an aperture 120, wherein the aperture has an axis B which is substantially perpendicular to the first axis A. The base portion 112 also has a bolt hole 122 adjacent one side of the aperture 120, wherein the bolt hole has an axis C which is substantially perpendicular to the aperture axis B and to the first axis A. The base portion 112 has a slot 124 defining a pair of opposing planar slot side walls 140, 142 extending from one end 126 of the base portion, through the bolt hole 122 and the aperture 120, and into the base portion on the opposite side of the aperture to the bolt hole, in a direction towards the other end 130 of the base portion. Slot end wall 144 extends between slot side walls 140, 142 and, as shown in FIGS. 5 and 6, at its location in base portion 112 beyond aperture 120 and toward the other end 130 of the base portion, slot end wall 144 may be substantially nonparallel with both first axis A and aperture axis B.

Figure 5:
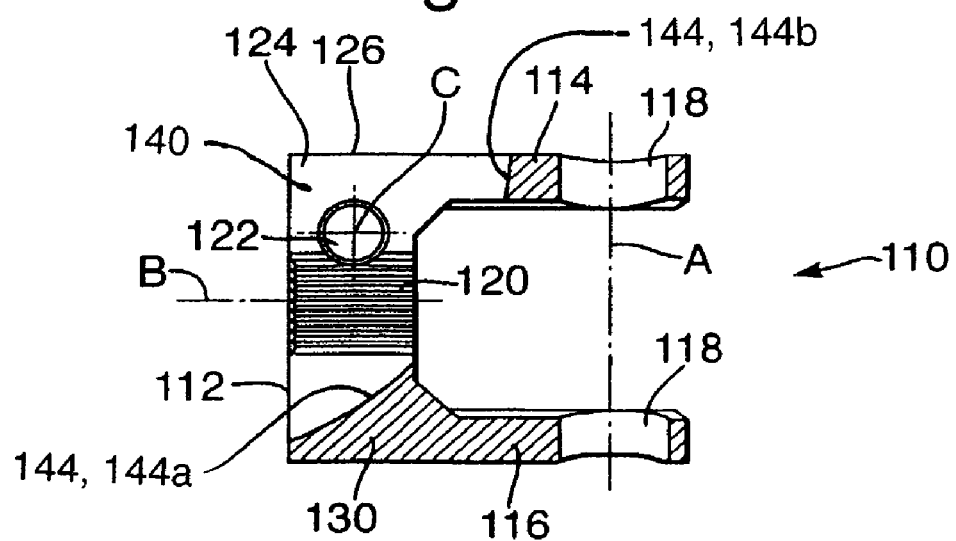
FIGS. 5 and 6 are cross-sectional and end views, respectively, of a clamp yoke in accordance with the present invention, manufactured by a method in accordance with the present invention.
Figure 6:
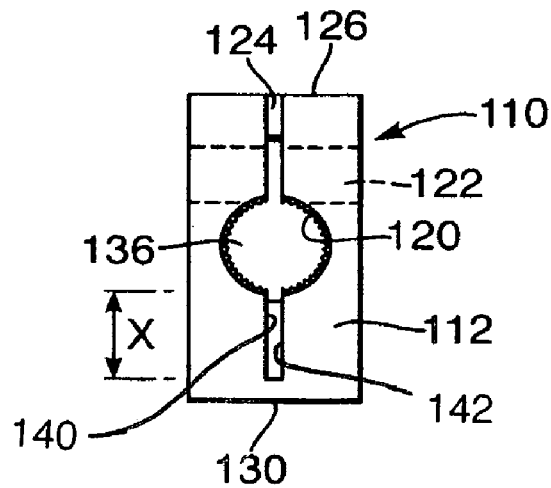

The slot 124 preferably extends a predetermined distance X beyond the aperture 120 towards the other end 130. Preferably, the slot 124 extends into the ear portion 114 at the one end 126 of the base portion 112. The slot 124 preferably lies in a plane which extends substantially perpendicular to the axis C of the bolt hole 122, that is, a plane which substantially aligns with and contains the aperture axis B and the first axis A. Preferably, the slot 124 has been formed by a cutting operation, preferably in a single cutting operation, and preferably using a substantially circular saw blade. Thus, slot end wall 144 which extends between opposing slot side walls 140, 142 may also extend discontinuously through base portion 112 and ear portion 114, having a first slot end wall segment 144a located in base portion 112 and a second slot end wall segment 144b located in ear portion 114, as shown in FIGS. 5 and 6. Further, as a consequence of slot 124 being preferably formed by a substantially circular saw blade, and preferably in a single cutting operation, slot end wall 144 may be substantially curved as best shown in FIG. 5.

DESCRIPTION OF THE PREFERRED EMBODIMENT

The method of forming the clamp yoke 110 includes the steps of cold forming a part having a substantially symmetrical U-shaped profile from a metallic blank, the part having the base portion 112 and the pair of ear portions 114, 116. The cold forming step may be performed in a single operation, but is preferably performed in several separate operations. The axially aligned holes 118 are formed in the ear portions 114, 116, preferably by a drilling operation. The aperture 120 is formed in the base portion 112, preferably initially by broaching during the cold forming step. The axis B of the aperture 120 is substantially perpendicular to the first axis A, the aligned axis of the holes 118 in the ear portions 114, 116. The aperture 120 is preferably formed with serrations 136 in the surface thereof, the serrations extending in a direction which is substantially parallel to the direction of the aperture axis B. The bolt hole 122 is formed, preferably by drilling, in the base portion 112 adjacent one side of the aperture 120, and preferably substantially tangential thereto. The axis C of the bolt hole 122 is substantially perpendicular to the aperture axis B and the first axis A. The slot 124 is cut in the base portion 112, preferably in a single operation, and preferably using a substantially circular saw blade. The slot 124 extends from the one end 126 of the base portion 112, through the bolt hole 122 and the aperture 120, and into the base portion on the opposite side of the aperture to the bolt hole.

Figure 1:
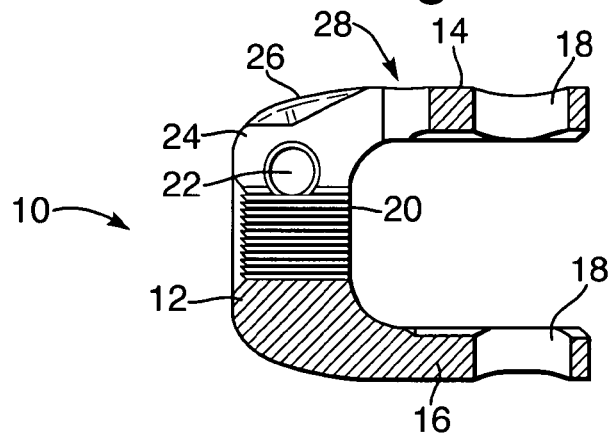
FIG. 1 is a cross-sectional view of a known clamp yoke.
Figure 2:
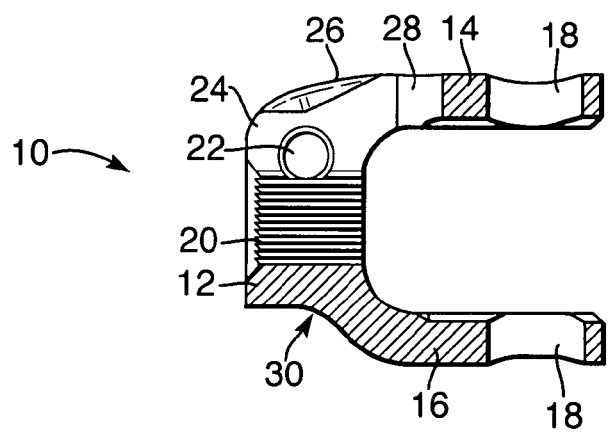
FIG. 2 is a cross-sectional view of another known clamp yoke.
Figure 3:
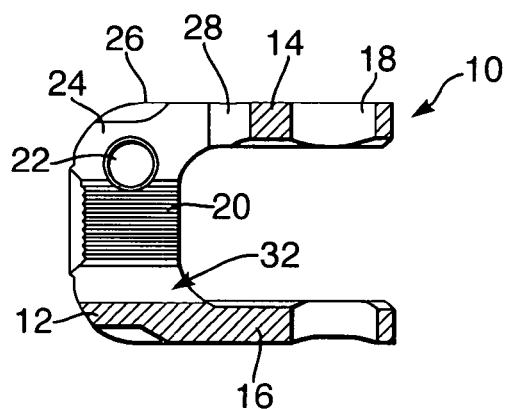
FIGS. 3 and 4 are cross-sectional and end views, respectively, of a further known clamp yoke.
Figure 4:
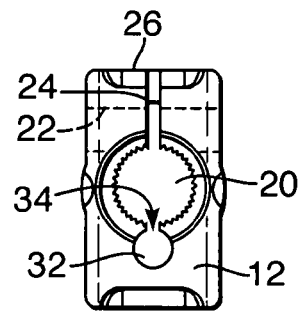

The present invention uses a symmetric cold formed yoke which is cheaper than using an asymmetric yoke. The present invention also avoids the need for additional drilling operations (as required by the prior art of FIGS. 1 to 4) which also reduces costs. The present invention optimises the sawing operation, and a smaller sawing tool can be used which is compatible with the shape of the clamp yoke. The base portion of the clamp yoke is also sawn in the area which is on the opposite side of the aperture to the bolt hole. In this way, the vertical hole 28 in the ear portion of the prior art (FIGS. 1 through 4) is no longer needed because the surface that is created by the slot creates substantially the same effect. Also, the horizontal hole 32 in the base portion of the prior art (FIGS. 3 and 4) can be avoided because the slot extension creates a hinge effect in the base portion thereby creating the desired elasticity. Finally, the removal of material from the other end 30 of the base portion (FIG. 2) is no longer required because the slot extension creates the desired elasticity. In this way, the cost of drilling two holes is saved, the cost of removal of material is avoided, and the overall manufacturing steps are easier.

The invention claimed is:

1. A clamp yoke for providing a pivotable connection between a pair of rotatable shafts, comprising a base portion and an ear portion at each end of the base portion, the yoke having a substantially symmetrical U-shaped profile; wherein each ear portion has a hole, the holes in the ear portions being substantially axially aligned on a first axis; wherein the base portion has an aperture, the aperture having an axis substantially perpendicular to the first axis; wherein the base portion has a bolt hole adjacent one side of the aperture, the bolt hole having an axis which is substantially perpendicular to the aperture axis and the first axis; wherein the base portion has a slot extending from one end of the base portion, through the bolt hole and into the aperture; and wherein the slot in the base portion defines a pair of opposed planar slot side walls and extends beyond the aperture on the opposite side of the aperture to the bolt hole and a slot end wall extends between the pair of slot side walls in the base portion on the opposite side of the aperture to the bolt hole, the slot end wall being substantially nonparallel with the aperture axis.

2. The clamp yoke of claim 1, wherein the slot extends a predetermined distance beyond the aperture.

3. The clamp yoke of claim 1, wherein the slot extends into the ear portion at said one end of the base portion.

4. The clamp yoke of claim 3, wherein, in the ear portion at said one end of the base portion, a second slot end wall extends between the pair of slot side walls.

5. The clamp yoke of claim 4, wherein the slot end wall located in the base portion is a first segment of the end wall, and the second slot end wall is a second segment of the slot end wall, and the slot end wall extends discontinuously between the base portion and the ear portion at said one end of the base portion.

6. The clamp yoke of claim 5, wherein the slot end wall is substantially curved.

7. The clamp yoke of claim 1, wherein the slot lies in a plane which is substantially perpendicular to the axis of the bolt hole.

8. The clamp yoke of claim 1, wherein the slot has been formed by a cutting operation.

9. The clamp yoke of claim 1, wherein the surface of the aperture includes serrations extending in a direction substantially parallel to the axis of the aperture.

10. The clamp yoke of claim 1, wherein the bolt hole is substantially tangential to the aperture.

11. The clamp yoke of claim 1, wherein the slot end wall in the base portion is substantially nonparallel with the first axis.

12. The clamp yoke of claim 1, wherein each of the pair of slot side walls is substantially parallel with the first axis and the aperture axis.

13. The clamp yoke of claim 1, wherein the slot end wall is substantially curved.

14. A clamp yoke for providing a pivotable connection between a pair of rotatable shafts, comprising:
   a base portion and an ear portion at each end of the base portion, the yoke having a substantially symmetrical U-shaped profile;
   each ear portion having a hole, the holes in the ear portions being substantially axially aligned on a first axis;
   the base portion having an aperture having an axis substantially perpendicular to the first axis;
   the base portion having a bolt hole adjacent one side of the aperture, the bolt hole having an axis which is substantially perpendicular to the aperture axis and the first axis;

the base portion further including a slot extending from one end of the base portion, through the bolt hole and into the aperture, the slot in the base portion defining a pair of opposed planar slot side walls and extending beyond the aperture on the opposite side of the aperture to the bolt hole; and
a curvilinear slot end wall extending between the pair of slot side walls in the base portion on the opposite side of the aperture to the bolt hole, the slot end wall being substantially non-parallel with the aperture axis.

* * * * *